(12) United States Patent
Bakshi et al.

(10) Patent No.: US 12,028,228 B1
(45) Date of Patent: Jul. 2, 2024

(54) SYSTEM AND METHOD TO DYNAMICALLY ANALYZE METADATA

(71) Applicant: Bank of America Corporation, Charlotte, NC (US)

(72) Inventors: Sakshi Bakshi, New Delhi (IN); Rajesh Kancharla, Hyderbad (IN); Himanshi Sharma, Gurugram (IN); Keerthivasan Kulasekaran, Chennai (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 18/469,123

(22) Filed: Sep. 18, 2023

(51) Int. Cl.
*H04L 43/06* (2022.01)
*H04L 41/14* (2022.01)

(52) U.S. Cl.
CPC ............ *H04L 43/06* (2013.01); *H04L 41/145* (2013.01)

(58) Field of Classification Search
CPC .............................. H04L 41/145; H04L 43/06
USPC ....................................................... 709/224
See application file for complete search history.

(56) References Cited

U.S. PATENT DOCUMENTS

| | | |
|---|---|---|
| 8,548,745 B2 | 10/2013 | Callahan et al. |
| 8,887,154 B2 | 11/2014 | Eksten et al. |
| 9,047,160 B2 | 6/2015 | Adi et al. |
| 9,098,364 B2 | 8/2015 | Davis |
| 9,274,595 B2 | 3/2016 | Reitan |
| 9,626,875 B2 | 4/2017 | Gal et al. |
| 9,665,437 B2 | 5/2017 | Bhargava et al. |
| 10,042,908 B2 | 8/2018 | Kuchibhotla et al. |
| 10,310,824 B2 | 6/2019 | Eksten et al. |
| 10,372,421 B2 | 8/2019 | Mack et al. |
| 10,474,559 B2 | 11/2019 | Moorthi et al. |
| 10,516,533 B2 | 12/2019 | Mannan et al. |
| 10,628,578 B2 | 4/2020 | Eksten et al. |
| 10,762,206 B2 | 9/2020 | Titonis et al. |
| 11,119,905 B2 | 9/2021 | Smith et al. |
| 11,126,427 B2 | 9/2021 | Sturtevant et al. |
| 11,272,026 B2 | 3/2022 | Walsh et al. |
| 11,770,398 B1 * | 9/2023 | Erlingsson .......... G06F 16/3329 709/224 |

(Continued)

FOREIGN PATENT DOCUMENTS

CN 107330125 B 6/2020

*Primary Examiner* — Wing F Chan
*Assistant Examiner* — Leon Y Tseng

(57) ABSTRACT

An apparatus may comprise a memory communicatively coupled to a processor. The memory may comprise application metadata and multiple expected application responses. The processor may be configured to generate a representative application based at least in part upon the application metadata, simulate multiple application operations by the first representative application, and monitor multiple simulated application responses during simulation of the application operations. Further, the processor is configured to determine whether the simulated application responses comprise an output that is different from any of those in the expected application responses, determine a possible modification to application configuration parameters configured to prevent the output in response to determining the first output, and generate a report indicating one or more instructions to incorporate the possible modification into the application configuration parameters.

20 Claims, 2 Drawing Sheets

(56) References Cited

U.S. PATENT DOCUMENTS

| | | | |
|---|---|---|---|
| 2014/0337000 A1* | 11/2014 | Asenjo | G06Q 10/06 |
| | | | 703/13 |
| 2016/0092247 A1* | 3/2016 | Branson | G06F 11/3409 |
| | | | 703/22 |
| 2019/0340518 A1 | 11/2019 | Merrill et al. | |
| 2020/0050537 A1* | 2/2020 | Schmalz, Jr. | G06F 11/3672 |
| 2021/0081806 A1* | 3/2021 | Chai | G06F 16/9024 |
| 2021/0392202 A1* | 12/2021 | Henning | H04L 41/145 |

\* cited by examiner

SYSTEM AND METHOD TO DYNAMICALLY ANALYZE METADATA

TECHNICAL FIELD

The present disclosure relates generally to operation of a system configured to provide metadata extraction and processing, and more specifically to a system and method to dynamically analyze metadata.

BACKGROUND

In a release cycle, application operations are difficult to modify and evaluate without impacting the overall operation of the applications. The release cycle usually requires updates to be performed during maintenance windows which take the application offline and prevent users from engaging with the application. After an update is performed, the application may generate unintended outputs.

SUMMARY OF THE DISCLOSURE

In one or more embodiments, a system and method are configured to dynamically analyze metadata. The system and method are configured to ensure a sustainable release cycle in any integrated system through a closely supervised network of metadata relationships based on data fabric architecture forming a representative application. This representative application is a representative version of the application that is isolated from impacting operations of the application. The representative application may be generated based at least in part upon the metadata of the application. The representative application may be session-specific and version maintained. The representative application may improve planning and estimating any issues or deviations before features are released in the application and may help in identifying the impact of deployment end to end in a distributed network. The system and method may be compatible with any system of applications, which may allow imbedding into existing systems and work for any technology in which the application is expected to operate based on a metadata analysis.

In one or more embodiments, a system and method disclosed herein dynamically analyze metadata associated with an application. In some embodiments, the representative application is created based on known application metadata of the application. The representative application may be isolated from the original application such that changes to the representative application do not impact the original application. In this regards, the representative application operates as a clone of the application in a sandbox environment. In the sandbox environment, the representative application may simulate operations to be performed by the application while monitoring whether the representative application performs as expected. If the representative application does not perform as expected, the system and method may be configured to generate possible fixes to the representative application and test those fixes on a new version of the representative application. After determining fixes that allow the new version of the representative application to perform as expected, the system and method may generate a report with instructions on how to implement the fixes in the original application. The representative application may be deleted after the report is generated.

In one or more embodiments, the system and method described herein are integrated into a practical application of reducing, preventing, or eliminating negative impacts of updating an application as part of a release cycle. For example, the system and method may be configured to be integrated in a release cycle process without requiring any downtime of the application. The system and method ensure stability of any systems related to the application during release cycle validation ahead of releases or deployments. In particular, the system and method evaluate real time application operations in the representative application of the application, which prevents the updates of the application from being deployed with breakpoints or failures. In some embodiments, significant human resources, processing resources, and memory resources may be saved when an application is updated after evaluating and fixing any issues that may be caused by a given update. In some embodiments, the system and method prevent the admin server from going into a hung state or from being unresponsive.

In one or more embodiments, the system and method are directed to improvements in computer systems. Specifically, the system and method reduce processor and memory usage in the admin server by automating analysis of application metadata associated with an application. In this regard, the system and method are configured to update application operations after evaluating and fixing issues in the representative application without manually identifying or analyzing the operations of the application in alpha or beta releases. In some embodiments, the system and method provide a plugin tool that enable analysis of application operations under multiple circumstances without affecting or impacting the application. In some embodiments, the system and method provide application validation troubleshooting during release cycles.

In one or more embodiments, the system and method may be performed by an apparatus, such as the server. Further, the system may comprise the apparatus. In addition, the system and method may be performed as part of a process performed by the apparatus. As a non-limiting example, the apparatus may comprise a memory communicatively coupled to a processor. The memory may be configured to store application metadata of an application and multiple expected application responses indicating one or more expected outputs of one or more application operations to be performed by the application. The processor may be configured to generate a representative application based at least in part upon the application metadata. The representative application is an isolated virtual representation of the application and configured to simulate the one or more application operations without impacting the application. Further, the processor may be configured to simulate multiple application operations by the representative application, monitor multiple simulated application responses during simulation of the application operations, determine whether the simulated application responses comprises an output that is different from any of those in the expected application responses in response to monitoring multiple simulated application responses during simulation of the application operations, determine a possible modification to one or more application configuration parameters configured to prevent the output, and generate a report indicating one or more instructions to incorporate the possible modification into the application configuration parameters.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description.

DETAILED DESCRIPTION

Figure 1:
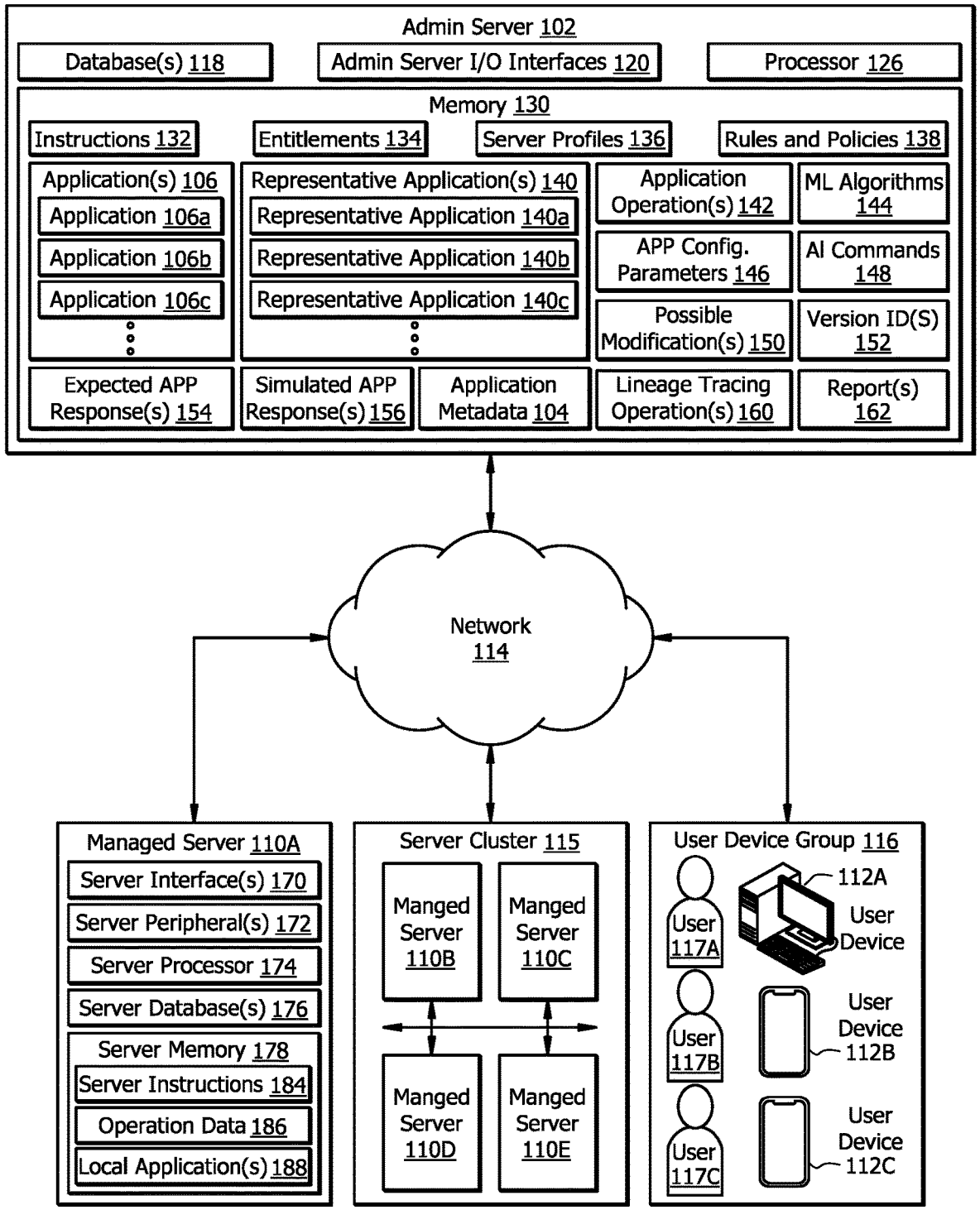
FIG. 1 illustrates a system in accordance with one or more embodiments.
Figure 2:
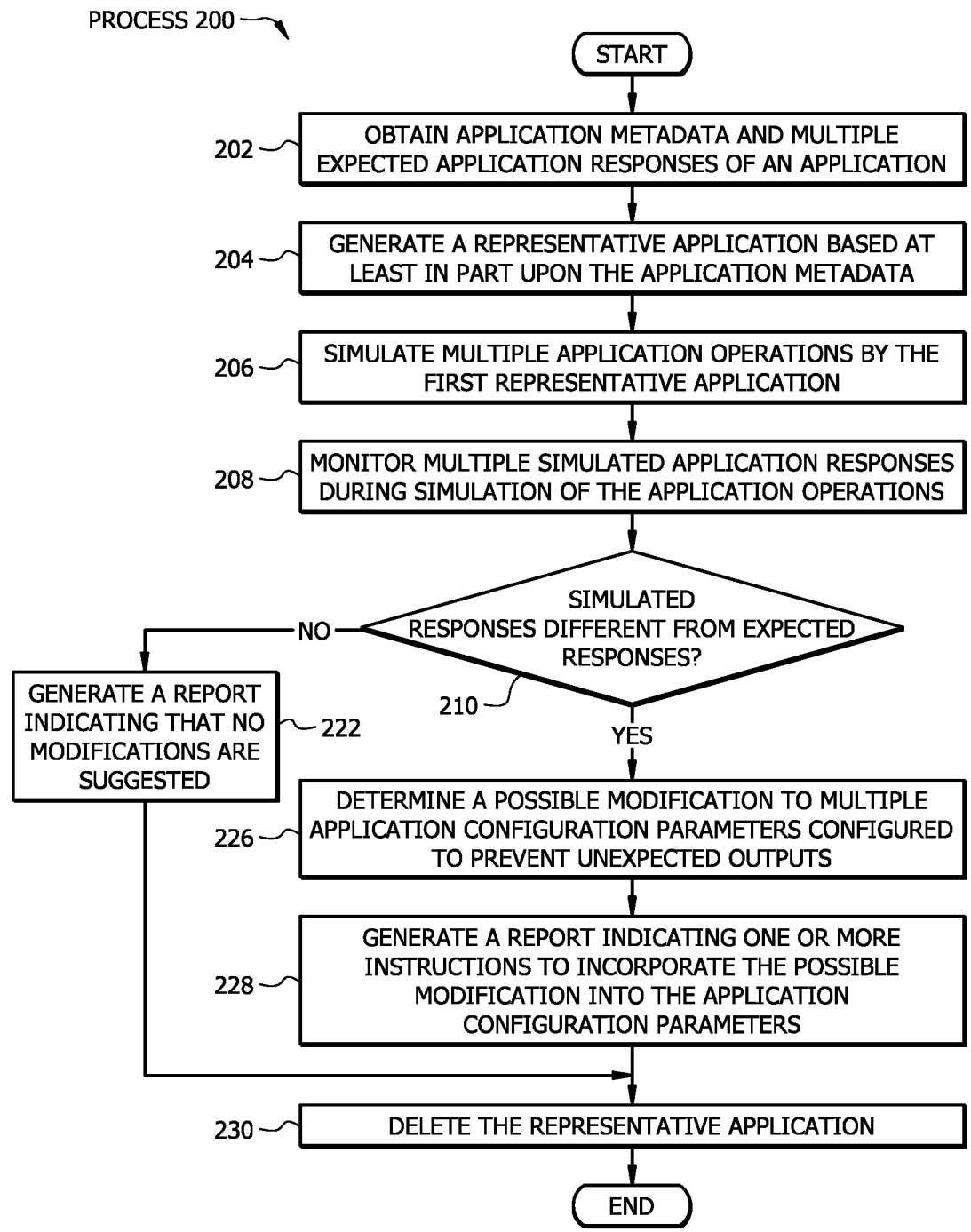
FIG. 2 illustrates an example flowchart of a method to dynamically analyze metadata.

As described above, this disclosure provides various systems and methods to analyze metadata of an application. FIG. 1 illustrates a system 100 in which an administration (admin) server 102 evaluates metadata of an application. FIG. 2 illustrates a process 200 performed by the system 100 of FIG. 1.

System Overview

FIG. 1 illustrates a system 100 configured to analyze application metadata 104 associated with one or more applications 106. In the system 100 of FIG. 1, an admin server 102 is communicatively coupled to multiple managed servers 110A-110F (collectively, managed servers 110) and multiple user devices 112A-112C (collectively, user devices 112) via a network 114. In some embodiments, the managed server 110A may be a single managed server communicating with the admin server 102. In other embodiments, the managed server 110B, the managed server 110C, the managed server 110D, and the managed server 110E may be incorporated in a server cluster 115. The server cluster 115 may comprise less or more managed servers 110 than those shown in FIG. 1. In yet other embodiments, the user device 112A, the user device 112B, and the user device 112C may be incorporated in a user device group 116. Each of the user device 112A, the user device 112B, and the user device 112C may be operated by a user 117A, a user 117B, and a user 117C, respectively. The user device group 116 may comprise less or more user devices 112 than those shown in FIG. 1.

In one or more embodiments, the admin server 102 comprises the databases 118, an admin server input (I)/output (O) interfaces 120, a processor 126 comprising a processing engine (not shown), and a memory 130. In some embodiments, the databases 118 may be standalone memory storage units or part of the memory 130. In some embodiments, the memory 130 may comprise instructions 132, one or more entitlements 134, multiple server profiles 136, multiple rules and policies 138, the one or more applications 106, one or more representative applications 140, one or more application operations 142, one or more machine learning (ML) algorithms 144, multiple application configuration parameters 146, one or more artificial intelligence (AI) commands 148, one or more possible modifications 150, one or more version identifiers (IDs) 152, one or more expected application responses 154, one or more simulated application responses 156, multiple application metadata 104, one or more lineage tracing operations 160, and one or more reports 162. In turn, referring to the managed server 110A as a non-limiting example, the managed servers may comprise one or more server interfaces 170, one or more server peripherals 172, a server processor 174, one or more server databases 176, and a server memory 178. The server memory 178 may comprise multiple server instructions 180, multiple operation data 182, and one or more local applications 188.

System Components

Admin Servers

The admin server 102 is generally any device or apparatus that is configured to process data and communicate with computing devices (e.g., the managed servers 110 and the user devices 112), additional databases, systems, and the like, via the one or more admin server I/O interfaces 120 (i.e., a user interface or a network interface). The admin server 102 may comprise the processor 126 that is generally configured to oversee operations of the processing engine. The operations of the processing engine are described further below in conjunction with the system 100 described in FIG. 1, and the process 200 described in FIG. 2.

The admin server 102 comprises multiple databases 118 configured to provide one or more memory resources to the admin server 102 and/or managed servers 110 and the user devices 112. The server 102 comprises the processor 126 communicatively coupled with the databases 118, the admin server I/O interfaces 120, and the memory 130. The admin server 102 may be configured as shown, or in any other configuration. In one or more embodiments, the databases 118 are configured to store data that enables the admin server 102 to configure, manage and coordinate one or more middleware systems. In some embodiments, the databases 118 store data used by the admin server 102 to act as a halfway point in between applications 106 and other tools or databases.

In one or more embodiments, the admin server I/O interfaces 120 may be configured to enable wired and/or wireless communications. The admin server I/O interfaces 120 may be configured to communicate data between the admin server 102 and other user devices (i.e., the managed servers 110 or the user devices 112), network devices (i.e., routers in the network 114), systems, or domain(s) via the network 114. For example, the admin server I/O interfaces 120 may comprise a WI-FI interface, a LAN interface, a WAN interface, a modem, a switch, or a router. The processor 126 may be configured to send and receive data using the admin server I/O interfaces 120. The admin server I/O interfaces 120 may be configured to use any suitable type of communication protocol. In some embodiments, the admin server I/O interfaces 120 may be an admin console comprising a web browser-based or graphical user interface used to manage a middleware server domain via the admin server 102. A middleware server domain may be a logically related group of middleware server resources that managed as a unit. A middleware server domain may comprise the admin server 102 and one or more managed servers 110. The managed servers 110 may be standalone devices (e.g., the managed server 110A) and/or collected devices in the server cluster 115 (e.g., managed servers 110B-110E). The server cluster 115 may be a group of managed servers that work together to provide scalability and higher availability for the applications 106. In this regard, the applications 106 are developed and deployed as part of at least one domain. In other embodiments, one instance of the managed servers 110 in the middleware server domain may be configured as the admin server 102. The admin server 102 provides a central point for managing and configure the managed servers 110, any of the one or more applications 106, and the one or more local applications 188.

The processor 126 comprises one or more processors communicatively coupled to the memory 130. The processor 126 may be any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). The processor 126 may be a programmable logic device, a microcontroller, a microprocessor, or any suitable combination of the preceding. The one or more processors 126 are configured to process data and may be implemented in hardware or software executed by hardware. For example, the processor 126 may be 8-bit, 16-bit, 32-bit, 64-bit or of any other suitable architecture. The processor 126 may include an arithmetic logic unit (ALU) for performing arithmetic and logic operations, processor registers that supply operands to the ALU and store the results of ALU operations, and a control unit that fetches the instructions 132 from the memory 130 and executes them by directing the coordinated operations of the ALU, registers and other components. In this regard, the one or more processors 126 are configured to execute various instructions. For example, the one or more processors 126 are configured to execute the instructions 132 to implement the functions disclosed herein, such as some or all of those described with respect to FIGS. 1 and 2. In some embodiments, the functions described herein are implemented using logic units, FPGAs, ASICs, DSPs, or any other suitable hardware or electronic circuitry.

In one or more embodiments, the admin server I/O interfaces 120 may be any suitable hardware and/or software to facilitate any suitable type of wireless and/or wired connection. These connections may include, but not be limited to, all or a portion of network connections coupled to the Internet, an Intranet, a private network, a public network, a peer-to-peer network, the public switched telephone network, a cellular network, a local area network (LAN), a metropolitan area network (MAN), a wide area network (WAN), and a satellite network. The admin server I/O interfaces 120 may be configured to support any suitable type of communication protocol as would be appreciated by one of ordinary skill in the art.

The memory 130 may be volatile or non-volatile and may comprise a read-only memory (ROM), random-access memory (RAM), ternary content-addressable memory (TCAM), dynamic random-access memory (DRAM), and static random-access memory (SRAM). The memory 130 may be implemented using one or more disks, tape drives, solid-state drives, and/or the like. The memory 130 is operable to store the instructions 132, the one or more entitlements 134, the server profiles 136 corresponding to one or more managed servers 110 and in association with the one or more entitlements 134 for each server profile 136, the rules and policies 138, the one or more applications 106, the one or more representative applications 140, the one or more application operations 142, the one or more ML algorithms 144, the application configuration parameters 146, the one or more AI commands 148, the one or more possible modifications 150, the one or more version IDs 152, the one or more expected application responses 154, the one or more simulated application responses 156, the application metadata 104, the one or more lineage tracing operations 160, the one or more reports 162, and/or any other data or instructions. The instructions 132 may comprise any suitable set of instructions, logic, rules, or code operable to execute the processor 126.

In one or more embodiments, the server profiles 136 may comprise multiple profiles for the managed servers 110. Each server profile 136 may be associated with one or more entitlements 134. The entitlements 134 may indicate that a given server is allowed to access one or more network resources in accordance with the one or more rules and policies 138. The entitlements 134 may indicate that a given managed server 110 is allowed to perform one or more operations in the system 100 (e.g., provide a specific application access to one of the user devices 112). To secure or protect operations of the managed servers 110 from bad actors, the entitlements 134 may be assigned to a given server profile 136 in accordance with updated security information, which may provide guidance parameters to the use of the entitlements 134 based at least upon corresponding rules and policies 138.

The rules and policies 138 may be security configuration commands or regulatory operations predefined by an organization or one or more users 117. In one or more embodiments, the rules and policies 138 may be dynamically defined by the one or more users 117. The rules and policies 138 may be prioritization rules configured to instruct one or more user devices 112 to establish one or more application configuration parameters 146 or perform one or more application operations in 144 in the system 100 in a specific order. The one or more rules and policies 138 may be predetermined or dynamically assigned by a corresponding user 117 or an organization associated with the user 117.

In one or more embodiments, the application operations 142 are operational files comprising configuration parameters to perform one or more tasks at the admin server 102. The application operations 142 may be configured to enable multiple middleware operations in the system 100. In some embodiments, the application operations 142 enable the admin server 102 to perform operations as an application programing interface (API), an application server running enterprise applications, an application integration server, a content-centric middleware server, a data integration server, or a device middleware server. The application operations 142 may maintain information associated with tracking time, an increasing counter, or a number of instances lapsed during pauses of operations in the admin server 102. In one or more embodiments, the application operations 142 comprise information concerning any use of the applications 106 associated with operations caused by the admin server 102 or the managed servers 110. The application operations 142 may indicate an active state or an inactive state depending on whether a given application 106 is expected to run on the admin server 102. Each installed application 106 may be an operation performed by the admin server 102. Further, each application 106 may be executed using the admin server 102 and the databases 118.

In some embodiments, the application configuration parameters 146 provide triggers in the form of communication or control signals to start operations such as fetching the instructions 132 or running one or more scripts. The application operations 142 and the application configuration parameters 146 may provide service information data indicating any services available in the admin server 102 and the managed servers 110. The application operations 142 and the application configuration parameters 146 may provide lists, security information, and configuration parameters that the admin server 102 uses to set up a specific application 106. The application operations 142 and the application configuration parameters 146 may be configuration data that provides starting procedure configuration to the admin server 102. In one or more embodiments, the application configuration parameters 146 may be optimized instructions that enable establishing of a specific procedure in the middleware server domain. In the example of FIG. 1, the application configuration parameters 146 comprise performing application installation operations configured to install multiple middleware scripts the admin server 102.

In one or more embodiments, the application metadata 104 is information data representative on one or more applications 106. The application metadata 104 may be data that extrapolates or summarizes application traffic information associated with one or more applications 106. In the example of FIG. 1, the applications 106 comprise an application 106a, an application 106b, and an application 106c among others. The applications 106 in the admin server 102 may comprise less or more applications 106 than those shown in FIG. 1. The application metadata 104 may be active metadata comprising business metadata and/or passive metadata comprising technical metadata. The active metadata is metadata being used by one of the applications 106 and may be dynamic in nature. The passive metadata may be metadata collected from the application 106 during the application operations 142 and may be static in nature.

In one or more embodiments, the ML algorithm 144 may be executed by the processor 126 to evaluate the application metadata 104. Further, the ML algorithm 144 may be configured to interpret and transform the application metadata 104 into structured data sets and subsequently stored as files or tables. The ML algorithm 144 may cleanse, normalize raw data, and derive intermediate data to generate uniform data in terms of encoding, format, and data types. The ML algorithm 144 may be executed to run user queries and advanced analytical tools on the structured data. The ML algorithm 144 may be configured to generate the one or more AI commands 148 based on a current application 106 and the existing application configuration parameters 146. In turn, the server processor 122 may be configured to generate the possible modifications 150 and the reports 162 based on the outputs of the ML algorithm 144. The AI commands 148 may be parameters that modify the possible modifications 150 and the reports 162. The AI commands 148 may be combined with the existing application configuration parameters 146 to create the possible modifications 150 and the reports 162. In one or more embodiments, the possible modifications 150 may be dynamically generated updates for the existing application configuration parameters 146.

The representative applications 140 may be clones of the one or more applications 106. In the example of FIG. 1, the representative applications 140 comprise a representative application 140a, a representative application 140b, and a representative application 140c among others. The representative applications 140 may comprise less or more application clones than those shown in FIG. 1. Each of the representative applications 140 may be associated to a corresponding version ID 152. The representative applications 140 may form a smart virtual layer over a corresponding application 106 and clone any environment metadata to simulate comparison environments. One or more simulated application responses 156 generated by the representative applications 140 may be evaluated while performing one or more application operations 142. In some embodiments, the simulated responses 156 may be compared to one or more of the expected application responses 154 to determine whether the representative applications 140 are performed as expected. For example, the representative application 140a may be a clone that is generated based on the analysis of the application metadata associated with the application 106a. In this regard, the representative application 140a may be an isolated virtual representation of the application 106a and configured to simulate the one or more application operations 142 without impacting the application 106a.

The lineage tracing operations 160 may be a smart lineage engine configured to train the ML algorithms 144 and to be controlled by the AI commands 148. In some embodiments, the lineage tracing operations 160 differentiates portions in the application metadata 104 during collection and flags accordingly. This tracking operation is a continuous process that is updated dynamically (i.e., on demand) or periodically, forming one or more inputs for dynamic knowledge of a given application 106. In some embodiments, the lineage tracing operations 160 may be configured to generate one or more blueprints based on the application metadata 104 that traces one or more information flows within the system 100. As part of the blueprint, the system 100 may be configured to evaluate every entity and component that exchanges data with the applications 106. The system 100 may be configured to track the applications 106 as part of an information flow and a version tracking in real time. In some embodiments, the lineage tracing operations 160 comprises AI lineage operations that extrapolate relationships with entities defined based on the application metadata 104. The system 100 performs the lineage tracing operations 160 to generate knowledge graph nodes that link elements in the application metadata 104 with each other and estimate impacts of any changes to the application configuration parameters 146.

The dynamic knowledge graph nodes may be generated as part of the lineage tracing operations 160. The lineage tracing operations 160 may be configured to validate unique and business relationships associated with the application metadata 104. The creation of the knowledge graphs may trigger a cognitive engine to create one of the representative applications 140 in the system 100. In some embodiments, the system 100 auto-optimizes a sandbox environment to evaluate the application operations 142. The system 100 may be configured to generate plans to find an optimal path to evaluate one or more application configuration parameters 146 in a given representative application 140. The ML algorithms 144 and the AI commands 148 may be configured to access a decentralized e-ledger-based distributed system which is processed and supervised by bidirectional encoder representations from transformers (BERT) algorithms that help to read e-ledgers from both ends of a given application operation 142. The ML algorithms 144 and the AI commands 148 may be configured to create one or more reports 162 indicating release and/or upgrade plans for a given application 106 along with change implementation/fix roadmap. The BERT algorithms may maintain e-ledger log migration details that ensure environment consistency and stability during release cycles in distributed systems. The system 100 eases out troubleshooting by real-time issue identification and impact in one of the representative applications 140.

In one or more embodiments, the databases 118 may be one of the server databases 176 in one of the managed servers 110. In one example, the admin server 102 may determine the processor 126 is available (e.g., running) to perform a specific application 106. In another example, the admin server 102 may determine that a specific managed server 110 is running to perform the specific application 106 upon receiving a server response indicating that a corresponding managed server 110 is available to perform the application 106. In one or more embodiments, the admin server 102 may determine whether the server processor 174 is available (e.g., running) to perform the specific local application 188. In yet another example, the admin server 102 may determine that the databases 118 are running to provide memory resources to execute the application 106 upon receiving a database response indicating that the databases 118 are available to provide memory resources to execute the applications 106. In one or more embodiments, the admin server 102 may determine whether the databases 118 are available (e.g., running) and may provide the database response. In one or more embodiments, one of the managed servers 110 may determine whether the corresponding server databases 176 are available (e.g., running) and may provide the database response.

The possible modifications 150 may be recommendations presented to the user devices 112 based on the expected application responses 154 and the simulated application responses 156. The possible modifications 150 may comprise one or more dynamic configuration commands to modify the one or more entitlements 134. In one or more embodiments, the dynamic configuration commands may comprise the one or more application configuration parameters 146 configured to control operations of the applications 106 and/or the representative applications 140. Each configuration command of the application configuration parameters 146 may be configured to dynamically provide control information to perform one or more of the operations based at least in part upon the analyzed data from the application metadata 104. The possible modifications 150 provide preventive solutions to changes in a release that may cause unintended impacts to the applications 106. In any integrated system where multiple applications 106 interact with each other, the system 100 may thoroughly perform impact checks of any changes to operations and whether modifications are needed to ensure any change is not impacting performance of the applications 106 upstream/downstream.

In one or more embodiments, the reports 162 may comprise a release roadmap to incorporate the one or more possible modifications 150 into the application configuration parameters 146 and possible impacts that may be mitigated by the possible modifications 150 in releases of the application 106. The possible impacts to the application to be caused by the possible modifications 150 may comprise possible changes to an application information flow and an application version tracking (i.e., the version IDs 152). In some embodiments, the reports 162 may be generated to indicate one or more instructions 132 to incorporate the one or more possible modifications 150 into the application configuration parameters 146 and cause the system 100 to delete any representative applications 140 generated.

In one or more embodiments, the reports 162 may be configured to output evaluation dashboards and auto-generated release plans with estimated deployment cycle metrices such as timing issues. The system 100 may be configured to plan the releases of the given application 106 with minimal issues and automated environment and operational comparisons to establish deployment stability. Once the differences are resolved in the sandbox environment for a given representative application 140, the representative applications 140 may be deleted or purged. This ensures minimal impact to cloud or overall distributed system for any changes in the applications 106, fixing the deployment issues right at the point of issue occurrence, and validating overall impact of the changes. For any similar deployments and/or upgrades, previous versions (i.e., with older version IDs 152) of the representative applications 140 may be referred for evaluation with ease.

Managed Servers

In some embodiments, the managed servers 110 may be configured to perform one or more of the operations described in reference to the admin server 102. As described above, the managed servers 110 may comprise the server interfaces 170, the server peripherals 172, the server processor 174, the server databases 176, and the server memory 178. The managed servers 110 may be hardware configured to create, transmit, and/or receive information. The managed servers 110 may be configured to receive inputs from a user, process the inputs, and generate data information or command information in response. The data information may include documents or files generated using a graphical user interface (GUI). The command information may include input selections/commands triggered by a user using a peripheral component or one or more server peripherals 172 (i.e., a keyboard) or an integrated input system (i.e., a touchscreen displaying the GUI). The managed servers 110 may be communicatively coupled to the admin server 102 via a network connection (i.e., the server peripherals 172). The managed servers 110 may transmit and receive data information, command information, or a combination of both to and from the admin server 102 via the server interfaces 170. In one or more embodiments, the managed servers 110 are configured to exchange data, commands, and signaling with the admin server 102. In some embodiments, the managed servers 110 are configured to receive at least one firewall configuration from the admin server 102 to implement a firewall (one of the one or more local applications 188) at one of the managed servers 110.

In one or more embodiments, the server interfaces 170 may be any suitable hardware or software (e.g., executed by hardware) to facilitate any suitable type of communication in wireless or wired connections. These connections may comprise, but not be limited to, all or a portion of network connections coupled to additional managed servers 110, the user devices 112, the admin server 102, the Internet, an Intranet, a private network, a public network, a peer-to-peer network, the public switched telephone network, a cellular network, a LAN, a MAN, a WAN, and a satellite network. The server interfaces 170 may be configured to support any suitable type of communication protocol.

In one or more embodiments, the one or more server peripherals 172 may comprise audio devices (e.g., speaker, microphones, and the like), input devices (e.g., keyboard, mouse, and the like), or any suitable electronic component that may provide a modifying or triggering input to the managed servers 110. For example, the one or more server peripherals 172 may be speakers configured to release audio signals (e.g., voice signals or commands) during media playback operations. In another example, the one or more server peripherals 172 may be microphones configured to capture audio signals. In one or more embodiments, the one or more server peripherals 172 may be configured to operate continuously, at predetermined time periods or intervals, or on-demand.

The server processor 174 may comprise one or more processors communicatively coupled to and in signal communication with the server interface 170, the server peripherals 172, and the server memory 178. The server processor 174 is any electronic circuitry, including, but not limited to, state machines, one or more CPU chips, logic units, cores (e.g., a multi-core processor), FPGAs, ASICs, or DSPs. The server processor 174 may be a programmable logic device, a microcontroller, a microprocessor, or any suitable combination of the preceding. The one or more processors in the server processor 174 are configured to process data and may be implemented in hardware or software executed by hardware. For example, the server processor 174 may be an 8-bit, a 16-bit, a 32-bit, a 64-bit, or any other suitable architecture. The server processor 174 may comprise an ALU to perform arithmetic and logic operations, processor registers that supply operands to the ALU, and store the results of ALU operations, and a control unit that fetches software instructions such as instructions 180 from the server memory 178 and executes the instructions 184 by directing the coordinated operations of the ALU, registers, and other components via a device processing engine (not shown). The server processor 174 may be configured to execute various instructions.

The server memory 178 may comprise multiple operation data 186 and one or more local applications 188 associated with the managed server 110. The operation data 186 may be data configured to enable one or more application operations 142 such as those described in relation with the admin server 102. The operation data 186 may be partially or completely different from those comprised in the memory 130. The local applications 188 may be one or more of the applications 106 described in relation with the admin server 102. In some embodiments, the local applications 188 may be partially or completely different from those comprised in the memory 130.

Network

The network 114 facilitates communication between and amongst the various devices of the system 100. The network 114 may be any suitable network operable to facilitate communication between the admin server 102, the one or more managed servers 110, and the user devices 112 of the system 100. The network 114 may include any interconnecting system capable of transmitting audio, video, signals, data, data packets, messages, or any combination of the preceding. The network 114 may include all or a portion of a public switched telephone network (PSTN), a public or private data network, a LAN, a MAN, a WAN, a local, regional, or global communication or computer network, such as the Internet, a wireline or wireless network, an enterprise intranet, or any other suitable communication link, including combinations thereof, operable to facilitate communication between the devices.

User Device

In one or more embodiments, each of the user devices 112 (e.g., the user devices 112A-112C) may be any computing device configured to communicate with other devices, such as the admin server 102, other user devices 112 in the user device group 116, databases, and the like in the system 100. Each of the user devices 112 may be configured to perform specific functions described herein and interact with one or more managed servers 110 and the user devices 112A-112C in the user device group 116. Examples of the user devices 112 comprise, but are not limited to, a laptop, a computer, a smartphone, a tablet, a smart device, an IoT device, a simulated reality device, an augmented reality device, or any other suitable type of device.

Operational Flow Overview

In one or more embodiments, the system 100 is configured to operate as a dynamic virtual digital mist system configured to ensure a sustainable release cycle in any integrated system through a closely supervised network of metadata relationships based on data fabric architecture forming a digital mist. This digital mist is an alternative name for the representative applications 140. The system 100 may perform one or more lineage tracing operations 160 to provide feasibility to trace a metadata digital blueprint. As described above, the blueprint may be configured to identify an ability of the system 100 to absorb functional and/or technical changes without having any negative business issues and/or technical issues. The representative applications 140 may be identified with a specific version ID 152. The version ID 152 may be an alphanumeric data string comprising multiple numbers and/or letters. In the representative applications 140, the system 100 implements multiple automated operations and compare the troubleshoot to find relevant fixes with help of cognitive AI engine and work in collaboration of the representative applications 140 to create simulated fixes and dry run the same in virtual environment. As described above, the simulated fixes may be one or more possible modifications 150 suggested to prevent one or more unintended outputs simulated using the representative applications 140. One or more issues may be identified in the outputs of the simulations upon comparing the expected application responses 154 and the simulated application responses 156.

In one or more embodiments, the system 100 may be a dynamic plugin utility compatible with any type of system. The system 100 may be configured to imbed into existing system and work for any technology of the application based on an analysis of the application metadata 104. At this stage, the system 100 may perform one or more lineage tracing operations 160 in which the knowledge graphs are closely integrated with lineage engines that operate as inline metadata analyzers to trace a record digital blueprint from beginning to end. As described above, the representative applications 140 may be virtual distributed instances that get temporarily created only for a duration of one or more sessions. The representative applications 140 replicate corresponding applications 106 and create an inbuilt clone for release or upgrade dry run and comparison.

Once the differences are resolved, the representative applications 140 may be deleted or purged. This approach ensures minimal impact to cloud and/or distributed systems for any changes in the representative applications 140, fixing any deployment issues right at the point of occurrence, and validating an overall impact of any changes. The representative applications 140 may be created and tagged to one of the version IDs 152. The system 100 may log all the findings and evaluation plans of the application operations 142 during simulations in the sandbox environment. Each version ID 152 may be a combination of a unique application identifier, a type of change (i.e., infrastructure layer, upgrade, and the like) and/or a sequence identifier generated for each new version of a given representative application 140. This combination is hashed to form a unique identifier and provides the system 100 with an easily accessible reference. In an event that a change is needed for an existing representative application 140, the system 100 may find any change history by following identification indexing. The system 100 may create additional representative applications 140 that incorporate previous suggested possible modifications 150. The newer representative applications 140 may be dry ran and evaluated using additional application operations before providing a release plan or any reports 162. In some embodiments, newer versions of the representative applications 140 may comprise changes or possible modifications 150 based on captured user inputs.

Process to Analyze Application Metadata

FIG. 2 illustrates an example flowchart of a process 200 to dynamically analyze metadata, in accordance with one or more embodiments. Modifications, additions, or omissions may be made to the process 200. The process 200 may comprise more, fewer, or other operations than those shown below. For example, operations may be performed in parallel or in any suitable order. While at times discussed as the server 102, or components of any of thereof performing operations described in the operations 202-234, any suitable system or components of the s system 100 may perform one or more operations of the process 200. For example, one or more operations of the process 200 may be implemented, at least in part, in the form of instructions 132 of FIG. 1, stored on non-transitory, tangible, machine-readable media (e.g., the admin server memory 130 or non-transitory computer readable medium storing the instructions 132 of FIG. 1) that when run by one or more processors (e.g., the admin server processor 126 of FIG. 1) may cause the one or more processors to perform operations described in the operations 202-230.

In one or more embodiments, the admin server 102 is configured to analyze the application metadata 104 associated to one or more of the applications 106. In the example of FIG. 2, the process 200 starts at operation 202, where the admin server 102 obtains the application metadata 104 and multiple expected application responses 154 of an application. The system 100 may obtain the application metadata 104 associated with a given application 106. Further, the system 100 may obtain application configuration parameters 146 by performing one or more lineage tracing operations 160 configured to extrapolate triggers and commands of the application from the application metadata 104. At operation 204, the admin server 102 generates a representative application 140 based at least in part upon the application metadata 104. For example, the system 100 may generate the representative application 140 based at least in part upon the application metadata 104 of a corresponding application 106.

The representative application 140 may be an isolated virtual representation of the application and configured to simulate one or more application operations 142 without impacting the application 106. At operation 206, the admin server 102 simulates multiple application operation operations 142 by the representative application 140. The system 100 may simulate multiple application operations 142 by the representative application 140. At operation 208, the admin server 102 monitors multiple simulated application responses during simulation of the application operations. In this regard, the system 100 may monitor multiple simulated application responses 156 during simulation of the application operations 142.

The process 200 proceeds to operation 210, where the admin server 102 determines whether outputs in the simulated application responses 156 match outputs in the expected application responses 154. If the admin server 102 determines that the simulated application responses 156 comprise the same (i.e., not different) outputs of the expected application responses 154 (e.g., NO), the process 200 proceeds to operation 222. At operation 222, the admin server 102 is configured to generate a report 162 indicating that no possible modifications 150 are suggested. If the admin server 102 determines that the simulated application responses 156 are different from the expected application responses 154 (e.g., YES), the process 200 proceeds to operation 226. The representative application 140 may be provisioned to incorporate inputs in the form of instructions being deployed and dry runs the changes to create common evaluation plans. In one or more embodiments, the process 200 comprises generating triggers for deployment validation and/or upgrade a corresponding application 106. At operation 228, the admin server 102 is configured to determine a possible modification 150 to multiple application configuration parameters 146 configured to prevent unexpected outputs. At operation 230, the admin server 102 generates a report 162 indicating one or more instructions 132 to incorporate the possible modification 150 into the application configuration parameters 146.

The process 200 may end at operation 230, where the admin server 102 may delete the representative application 140.

SCOPE OF THE DISCLOSURE

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. An apparatus, comprising:
   a memory, configured to store:
      application metadata of an application; and
      a plurality of expected application responses indicating one or more expected outputs of one or more application operations to be performed by the application; and
   a processor communicatively coupled to the memory and configured to:
      generate a first representative application based at least in part upon the application metadata, the first representative application being an isolated virtual representation of the application and configured to simulate the one or more application operations without impacting the application;
      simulate a first plurality of application operations by the first representative application;
      monitor a first plurality of simulated application responses during simulation of the first plurality of application operations;
      in response to monitoring the first plurality of simulated application responses during simulation of the first plurality of application operations, determine whether the first plurality of simulated application responses comprises a first output that is different from any of those in the plurality of expected application responses;
      in response to determining the first output, determine a first possible modification to a plurality of application configuration parameters configured to prevent the first output; and
      generate a first report indicating one or more instructions to incorporate the first possible modification into the plurality of application configuration parameters.

2. The apparatus of claim 1, wherein the processor is further configured to:
   in conjunction with determining the first possible modification to the plurality of application configuration parameters configured to prevent the first output, generate a second representative application based at least in part upon the application metadata and the first possible modification;

simulate a second plurality of application operations by the second representative application;

in response to monitoring a second plurality of simulated application responses during simulation of the second plurality of application operations, determine whether the second plurality of simulated application responses comprises a second output that is different to those comprised in the plurality of expected application responses;

in response to determining the second output, determine a second possible modification to the plurality of application configuration parameters configured to prevent the second output; and generate a second report indicating one or more instructions to incorporate the second possible modification into the plurality of application configuration parameters.

3. The apparatus of claim 1, wherein the processor is further configured to:

in conjunction with determining the first possible modification to the plurality of application configuration parameters configured to prevent the first output, generate a second representative application based at least in part upon the application metadata and the first possible modification;

simulate the first plurality of application operations by the second representative application; and in response to monitoring a second plurality of simulated application responses during simulation of the first plurality of application operations, determine that the second plurality of simulated application responses does not comprise the first output that is different from any of those in the plurality of expected application responses.

4. The apparatus of claim 1, wherein the application metadata comprises active metadata and passive metadata.

5. The apparatus of claim 1, wherein the processor is further configured to:

obtain the plurality of application configuration parameters by performing one or more lineage tracing operations configured to extrapolate triggers and commands of the application from the application metadata.

6. The apparatus of claim 1, wherein the first report further comprises a release roadmap to incorporate the first possible modification into the plurality of application configuration parameters and a plurality of possible impacts to the application to be caused by the first possible modification.

7. The apparatus of claim 6, wherein the plurality of possible impacts to the application to be caused by the first possible modification comprise possible changes to an application information flow and an application version tracking.

8. The apparatus of claim 1, wherein the processor is further configured to:

in conjunction with generating the first report indicating the one or more instructions to incorporate the first possible modification into the plurality of application configuration parameters, delete the first representative application.

9. A method, comprising:

generating a first representative application based at least in part upon application metadata of an application, the first representative application being an isolated virtual representation of the application and configured to simulate one or more application operations without impacting the application;

simulating a first plurality of application operations by the first representative application;

monitoring a first plurality of simulated application responses during simulation of the first plurality of application operations;

in response to monitoring the first plurality of simulated application responses during simulation of the first plurality of application operations, determining whether the first plurality of simulated application responses comprises a first output that is different from any of those in a plurality of expected application responses indicating one or more expected outputs of one or more application operations to be performed by the application;

in response to determining the first output, determining a first possible modification to a plurality of application configuration parameters configured to prevent the first output; and generating a first report indicating one or more instructions to incorporate the first possible modification into the plurality of application configuration parameters.

10. The method of claim 9, further comprising:

in conjunction with determining the first possible modification to the plurality of application configuration parameters configured to prevent the first output, generating a second representative application based at least in part upon the application metadata and the first possible modification;

simulating a second plurality of application operations by the second representative application;

in response to monitoring a second plurality of simulated application responses during simulation of the second plurality of application operations, determining whether the second plurality of simulated application responses comprises a second output that is different to those comprised in the plurality of expected application responses;

in response to determining the second output, determining a second possible modification to the plurality of application configuration parameters configured to prevent the second output; and generating a second report indicating one or more instructions to incorporate the second possible modification into the plurality of application configuration parameters.

11. The method of claim 9, further comprising:

in conjunction with determining the first possible modification to the plurality of application configuration parameters configured to prevent the first output, generating a second representative application based at least in part upon the application metadata and the first possible modification;

simulating the first plurality of application operations by the second representative application; and in response to monitoring a second plurality of simulated application responses during simulation of the first plurality of application operations, determining that the second plurality of simulated application responses does not comprise the first output that is different from any of those in the plurality of expected application responses.

12. The method of claim 9, wherein the application metadata comprises active metadata and passive metadata.

13. The method of claim 9, further comprising:

obtaining the plurality of application configuration parameters by performing one or more lineage tracing operations configured to extrapolate triggers and commands of the application from the application metadata.

14. The method of claim 9, the first report further comprises a release roadmap to incorporate the first possible modification into the plurality of application configuration parameters and a plurality of possible impacts to the application to be caused by the first possible modification.

15. The method of claim 14, wherein the plurality of possible impacts to the application to be caused by the first possible modification comprise possible changes to an application information flow and an application version tracking.

16. The method of claim 9, further comprising:
in conjunction with generating the first report indicating the one or more instructions to incorporate the first possible modification into the plurality of application configuration parameters, delete the first representative application.

17. A non-transitory computer readable medium storing instructions that when executed by a processor cause the processor to:
generate a first representative application based at least in part upon application metadata of an application, the first representative application being an isolated virtual representation of the application and configured to simulate one or more application operations without impacting the application;
simulate a first plurality of application operations by the first representative application;
monitor a first plurality of simulated application responses during simulation of the first plurality of application operations;
in response to monitoring a first plurality of simulated application responses during simulation of the first plurality of application operations, determine whether the first plurality of simulated application responses comprises a first output that is different from any of those in a plurality of expected application responses indicating one or more expected outputs of one or more application operations to be performed by the application;
in response to determining the first output, determine a first possible modification to a plurality of application configuration parameters configured to prevent the first output; and
generate a first report indicating one or more instructions to incorporate the first possible modification into the plurality of application configuration parameters.

18. The non-transitory computer readable medium of claim 17, wherein the processor is further caused to:
in conjunction with determining the first possible modification to the plurality of application configuration parameters configured to prevent the first output, generating a second representative application based at least in part upon the application metadata and the first possible modification;
simulating a second plurality of application operations by the second representative application;
in response to monitoring a second plurality of simulated application responses during simulation of the second plurality of application operations, determining whether the second plurality of simulated application responses comprises a second output that is different to those comprised in the plurality of expected application responses;
in response to determining the second output, determining a second possible modification to the plurality of application configuration parameters configured to prevent the second output; and
generating a second report indicating one or more instructions to incorporate the second possible modification into the plurality of application configuration parameters.

19. The non-transitory computer readable medium of claim 17, wherein the processor is further caused to:
in conjunction with determining the first possible modification to the plurality of application configuration parameters configured to prevent the first output, generating a second representative application based at least in part upon the application metadata and the first possible modification;
simulating the first plurality of application operations by the second representative application; and
in response to monitoring a second plurality of simulated application responses during simulation of the first plurality of application operations, determining that the second plurality of simulated application responses does not comprise the first output that is different from any of those in the plurality of expected application responses.

20. The non-transitory computer readable medium of claim 17, wherein the application metadata comprises active metadata and passive metadata.

* * * * *